US010179856B2

(12) United States Patent
Karrer et al.

(10) Patent No.: US 10,179,856 B2
(45) Date of Patent: Jan. 15, 2019

(54) BIODEGRADABLE MATERIAL MADE OF BIOLOGICAL COMPONENTS

(71) Applicant: FLUID SOLIDS AG, Zürich (CH)

(72) Inventors: Beat Karrer, Zürich (CH); Daniel Schwendemann, Pfullendorf (DE); Bettina Müller, Jona (CH); Florian Gschwend, Rapperswil-Jona (CH)

(73) Assignee: FLUID SOLIDS AG, Zürich (CH)

( * ) Notice: Subject to any disclaimer, the term of this patent is extended or adjusted under 35 U.S.C. 154(b) by 742 days.

(21) Appl. No.: 14/391,744

(22) PCT Filed: Apr. 15, 2013

(86) PCT No.: PCT/CH2013/000060
§ 371 (c)(1),
(2) Date: Oct. 10, 2014

(87) PCT Pub. No.: WO2013/152448
PCT Pub. Date: Oct. 17, 2013

(65) Prior Publication Data
US 2015/0048554 A1 Feb. 19, 2015

(30) Foreign Application Priority Data

Apr. 13, 2012 (CH) .......................... 509/12

(51) Int. Cl.
B29C 64/106 (2017.01)
C08L 89/06 (2006.01)
C08L 97/02 (2006.01)
C08J 5/10 (2006.01)
B28B 7/34 (2006.01)
B28B 7/36 (2006.01)
B28B 5/00 (2006.01)
B29C 39/00 (2006.01)
B29C 47/00 (2006.01)
C08L 89/00 (2006.01)
C08K 3/22 (2006.01)
C08K 3/30 (2006.01)
B28B 7/00 (2006.01)
B28B 7/20 (2006.01)
B29C 35/08 (2006.01)
B29K 105/00 (2006.01)
B29L 31/00 (2006.01)
B29C 64/112 (2017.01)

(52) U.S. Cl.
CPC ............. *C08L 89/06* (2013.01); *B28B 5/00* (2013.01); *B28B 7/342* (2013.01); *B28B 7/346* (2013.01); *B28B 7/348* (2013.01); *B28B 7/36* (2013.01); *B29C 39/003* (2013.01); *B29C 47/0004* (2013.01); *B29C 47/004* (2013.01); *B29C 64/106* (2017.08); *C08J 5/10* (2013.01); *C08L 89/00* (2013.01); *C08L 97/02* (2013.01); *B28B 7/0064* (2013.01); *B28B 7/20* (2013.01); *B29C 64/112* (2017.08); *B29C 2035/0827* (2013.01); *B29K 2089/00* (2013.01); *B29K 2105/0058* (2013.01); *B29K 2995/0062* (2013.01); *B29L 2031/757* (2013.01); *C08J 2389/06* (2013.01); *C08K 2003/2265* (2013.01); *C08K 2003/3045* (2013.01); *C08L 2201/06* (2013.01); *C08L 2205/06* (2013.01)

(58) Field of Classification Search
None
See application file for complete search history.

(56) References Cited

U.S. PATENT DOCUMENTS

| 5,360,586 A | 11/1994 | Wyatt et al. | |
|---|---|---|---|
| 5,589,518 A * | 12/1996 | Bastioli | B29C 67/205 521/53 |
| 6,010,596 A * | 1/2000 | Song | C04B 28/14 106/660 |
| 6,274,838 B1 | 8/2001 | Demers et al. | |
| 7,387,756 B2 | 6/2008 | Guilbert et al. | |
| 2006/0135668 A1* | 6/2006 | Hayes | B32B 27/36 524/430 |
| 2008/0188593 A1* | 8/2008 | Bastioli | C08G 63/16 524/35 |
| 2011/0052881 A1* | 3/2011 | Netravali | B32B 9/02 428/178 |
| 2011/0057144 A1* | 3/2011 | Schoenfeld | C08G 18/36 252/62 |
| 2011/0104465 A1* | 5/2011 | Bilodeau | A01G 13/0268 428/219 |
| 2015/0048554 A1* | 2/2015 | Karrer | C08L 89/06 264/401 |

FOREIGN PATENT DOCUMENTS

| CN | 102031005 A | 4/2011 |
| DE | 3341183 C | 3/1921 |
| DE | 461775 C | 6/1928 |
| WO | WO 2004/029135 A2 | 4/2004 |
| WO | WO 2009/079579 A1 | 6/2009 |

OTHER PUBLICATIONS

Chinese Office Action dated Dec. 3, 2015 in corresponding Chinese Application No. 201380031258.1.

* cited by examiner

Primary Examiner — Melvin C. Mayes
Assistant Examiner — Colette B Nguyen
(74) Attorney, Agent, or Firm — Birch, Stewart, Kolasch & Birch, LLP

(57) ABSTRACT

The invention relates to a biodegradable material made of biological components, comprising 10 to 60 wt. % of a protein adhesive (1), which is made of at least one protein, and 2 to 50 wt. % of natural fibers (4). Furthermore, 2 to 15 wt. % of at least one hygroscopic mineral (7), 10 to 55 wt. % of water (2), and 0 to 50 wt. % of an additive component (5) are provided in the material (10).

24 Claims, 1 Drawing Sheet

BIODEGRADABLE MATERIAL MADE OF BIOLOGICAL COMPONENTS

TECHNICAL FIELD

The invention relates to a degradable material made of biological components, and also to a method for producing a molded part made of a degradable material.

PRIOR ART

U.S. Pat. No. 7,387,756 (Guilbert et al.) describes a method for producing a material based on natural fibers. The natural fibers are mixed in powder form with a natural protein binder, wherein the natural fibers have a moisture content of 1-15%. The moisture content is set to 6-24% and the mixture is then molded by a hot-press operation.

U.S. Pat. No. 6,284,838 (Novamont SpA) discloses a biodegradable composition made of lignin or a lignin-containing material and a protein. The composition can also comprise further additives. The lignin or lignin-containing material is heated together with the protein and melted. As lignin-containing material, fine wood particles can also be used. As a preferred protein, vegetable or animal casein or gelatin is used.

U.S. Pat. No. 5,360,586 (Wyatt Danny) describes a method for producing a degradable molded part made of a cellulosic material. The cellulosic material comprises less than 50% water and is mixed with a binder and a foaming agent. The mixture is charged into an extruder, mixed with water and then extruded to form a molded part.

DE 461 775 (Hans Brandt) discloses a wood substitute composition which is cheaper and lighter than wood and has a higher flash point and also a higher water resistance. To produce the composition, paper is boiled in potassium hydroxide solution and then mixed with tannic acid and sodium hydroxide. The composition is dried and pulverized. Then the powder is mixed with cement, sodium carbonate, talc and antimony chloride, and also a solution of hide glue in hydrogen sulfide is added under stirring. The resultant composition can be rolled out on sheets or pressed to form moldings.

DE 334 183 (Dr. Kukula) describes a wood substitute composition for producing pencil bodies. The composition is produced from a mixture of wood fibers with minerals and water. As binder, glue and dextrin or plant mucilage is added to the mixture. The composition is pressed without heating under moderate pressure into suitable molds. As an example, it is mentioned that 4 to 5 parts by weight of ground wood or sawdust, to which a small amount of wood pulp can be added, can be mixed with one part by weight of asbestos, kieselguhr or talc, and also one part by weight of bone glue or gelatin and one part by weight of plant mucilage or dextrin with addition of a very small amount of water.

WO 2009/079579 (E2E Materials) describes biodegradable formaldehyde-free corrugated cardboard, in particular corrugated cardboard having an adhesive made of soy. The corrugated cardboard consists of a first board which has been produced from a soy resin, and also further boards made of plant fiber material. The first board is bound to a corrugating element. The plant fibers can comprise flax, hemp, China grass, sisal, jute, kapok, banana, pineapple or kenaf fibers. The fibers can be present as woven or non-woven textile. Preferably, the fibers, however, are present as non-woven mats which are held together by a natural binder such as, e.g., polylactide. The corrugating element is preferably produced from puffed grains, in particular from wheat, rice or corn grains. In a first step of a production method, a first number of boards made of plant fibers are impregnated with a soy resin, dried, compressed to form a pressed board and then glued to a corrugating element. Finally, a second pressed board is glued to the corrugating element. The soy resin can additionally contain a polysaccharide, in particular agar, gellan, or a mixture thereof.

WO 2004/029135 (K. U. Leuven) discloses a biopolymer based on gluten and also a composite material made of fibers which are coated with gluten. The material is produced by mixing gluten with molecules that contain a plurality of thiol groups. The gluten for this purpose is dispersed together with the molecules in a preferably aqueous solution. In addition, fibers can also be coated with gluten and processed to form a composite material. The fibers can be either synthetic or natural. In a particular embodiment, a gluten network is formed around the fibers. The resultant fiber matrix can then be pressed in a die-casting method. As fibers, either cellulose fibers can be used here, or else straws, pods, husks or fruits.

It is disadvantageous with the previously known materials that molded parts produced from these materials first exhibit only a low mechanical stability, since the curing thereof, in particular in the presence of protein glues, takes some time. In addition, these materials must be disposed of in waste, since not all of the materials used are degradable and environmentally acceptable.

DESCRIPTION OF THE INVENTION

The object of the invention is to provide a material appropriate to the technical field mentioned at the outset, which material cures more rapidly compared with the materials known from the prior art, in order that a molded part produced therefrom has a good mechanical stability as rapidly as possible, which can be disintegrated completely and is degradable.

Achieving the object is defined by the features of claim 1. According to the invention, the material comprises from 10 to 60 percent by weight of a protein glue made of at least one protein. The degradable material additionally comprises from 2 to 50 percent by weight of natural fibers, from 2 to 15 percent by weight of at least one hygroscopic mineral, and also from 10 to 55 percent by weight of water. In addition, an additive component can be present in the material in an amount of 0 to 50 percent by weight.

The material according to the invention is "degradable". In the context of the present application, this is taken to mean that the material can be completely disintegrated via biological processes.

"Protein glues" in the context of the application are taken to mean protein solutions which can form a three-dimensional network via a curing process. This curing process is preferably reversible, in particular by addition of water and additional action of heat. Preferably, a protein glue consists of a single protein or a single protein class. Alternatively, the protein glue can also consist of a plurality of different proteins or of proteins of different protein classes.

The material comprises from 10 to 60 percent by weight, preferably from 30 to 50 percent by weight, particularly preferably from 40 to 45 percent by weight, of protein glue.

The material further comprises from 2 to 50 percent by weight, preferably from 5 to 35 percent by weight, particularly preferably from 7 to 20 percent by weight, of natural fibers.

In addition, from 2 to 15 percent by weight, preferably from 5 to 12 percent by weight, particularly preferably from 7 to 10 percent by weight, of at least one hygroscopic mineral and from 10 to 55 percent by weight, preferably 20 to 50 percent by weight, particularly preferably from 35 to 45 percent by weight, of water are present in the degradable material. The hygroscopic mineral particularly preferably is present in the material in powder form.

In addition, the material can comprise an additive component in an amount from 0 to 50 percent by weight, preferably from 10 to 40 percent by weight, particularly preferably from 20 to 30 percent by weight. The additive component need not necessarily be present in the material. The material according to the invention achieves the technical object mentioned further above even without an additive component.

By the addition of a hygroscopic mineral, the water present in the material as water of crystallization adds to the hygroscopic mineral, as a result of which the curing rate of the protein glue is increased. In addition, the hygroscopic mineral can additionally bind to the water, which leads to a molded part produced from the material relatively rapidly having a good mechanical stability, even before complete curing of the protein glue.

An important advantage of the material according to the invention is that it may be dissolved completely in hot water. Owing to the composition of the material of pure natural substances, the resultant aqueous solution can be disposed of without problems as wastewater, or used for fertilizing plants. Alternatively, a molded part produced from the material can be burnt for disposal, wherein, owing to the use of renewable raw materials, a virtually neutral $CO_2$ balance results. In addition, the material according to the invention, after use, can also be utilized as compost.

The degradable material is initially liquid and can therefore be processed very readily to form molded parts, for example by pressing or by extrusion. In addition, it has been established that the material according to the invention may also be used as substrate for a three-dimensional printer.

As hygroscopic mineral, preferably at least one of the following substances is used: aluminium hydroxide, bentonite, calcium sulfate calcium chloride, calcium carbonate, calcium oxide, calcium hydroxide, calcium aluminate, calcium silicate, potassium silicate, potassium carbonate, silica, lithium silicate, magnesium sulfate, magnesium carbonate, magnesium chloride, magnesium hydrogensulfate, magnesium silicate, sodium sulfate, sodium acetate, sodium hydrogensulfate, pentasodium triphosphate, sepiolite, silica gel (silicic acid gel), silicon dioxide, zeolite. The hygroscopic mineral further preferably comprises a mixture of at least two of said substances.

The calcium sulfate is used particularly preferably in the form of commercially conventional gypsum powder, whereas lithium, sodium and potassium silicates are preferably used in the form of what is termed amorphous "water glass". As zeolite, particularly preferably what are termed molecular sieves are used, preferably having a pore size of 3 angstroms.

Preferably, the protein glue contains glutin, collagen, alginates, albumin, gelatin, chondrin, agar-agar, xanthan or a mixture thereof. Protein glues made of glutin may be relatively easily produced form bones, cartilage or hides of animals. As collagen glue, gelatin can be used, which is obtainable in large amounts from the food industry. Alginates can be used in the material according to the invention primarily as pulverulent salts of alginic acid, such as, e.g., sodium alginate, potassium alginate, ammonium alginate or calcium alginate.

Furthermore, in addition to the protein glue, lignin sulfonate, lignin, glucose or dextrin can be used as further binder.

Alternatively, further protein glues are also usable in a material according to the invention such as, e.g., fibrin glue or the glue proteins from mussels. These protein glues, however, are currently available only in small amounts and only at a high price, for which reason it is not economically worthwhile adding them to the material according to the invention.

Preferably, bone glue, hide glue, rabbit-skin glue or fish glue is used as protein glues. These glues are readily available even in large amounts and in addition cheap. Furthermore, use thereof, on account of their relatively low melting temperature, is simple since the material need not be heated to a high temperature for production and application.

The natural fibers advantageously comprise wood fibers, cereal fibers, nutshell fibers, grass fibers, cornmeal, cellulose fibers, cellulose flakes or a mixture thereof.

Natural fibers of this type occur as waste products in agriculture, forestry and also the wood pulp industry. Particularly preferably, softwood fibers are used as natural fibers. The natural fibers can have differing sizes depending on the molded part to be produced by the material. Preferably, natural fibers having a length from 0.5 mm to 50 mm are used. Alternatively, however, the natural fibers can also be used in powder form, for example as powder having a mean particle size from 0.01 mm to 0.5 mm. A powder of this type can be produced, e.g., by grinding natural fibers. The natural fibers give the cured material the required mechanical strength in order to bear even relatively large loads, for example if a chair or a table is produced therefrom.

The fibers can be used in their natural state or alternatively also after a chemical modification. For example, cellulose fibers can be chemically modified by methylation, sulfonation, nitration, acetylation etc., before they are used for the material according to the invention.

In principle, for the material according to the invention, all types of plant fibers may be used, for instance, e.g. also bamboo fibers, hemp fibers, rice husk fibers or the like.

As hygroscopic mineral, preferably calcium sulfate, magnesium sulfate or a mixture thereof is used. Particularly preferably, the hygroscopic mineral is used in the form of a powder. As calcium sulfate, preferably commercially available gypsum powder is used. Both calcium sulfate and magnesium sulfate are very hygroscopic and bind the water of the material as water of crystallization. This reduces the amount of unbound water present in the material, as a result of which curing the protein glue is accelerated. The use of calcium sulfate additionally increases the stability of a molded part produced from the material, since calcium sulfate additionally binds to the water of the material and thereby forms a mechanically stable structure.

The advantageous action of the hygroscopic mineral is due to the free water present in the material being bound. Therefore, it should be clear to those skilled in the art that forms of the hygroscopic mineral that are as free from water as possible should be used for producing the material. Preferably, accordingly, the calcium sulfate should be used as anhydrite and also water-free magnesium sulfate or magnesium sulfate monohydrate should be used.

A further advantage of the hygroscopic mineral is the exothermy of addition of water of crystallization. Owing to the heat energy released, the curing of the protein glue is accelerated, which leads to a more rapid solidification of the material.

The additive component preferably comprises from 1 to 10 percent by weight, preferably from 2 to 8 percent by weight, of at least one biodegradable plasticizer. The biodegradable plasticizer is preferably glycerol, urea, triethyl citrate, sorbitol, xanthan, or an alkyl citrate. Adding a plasticizer can modify the brittleness of the material. For instance, the elasticity, for example, of molded parts produced from the material can be modified.

Alternatively, conventional plasticizers, as are known, e.g., from the polymer industry, can also be used. However, such plasticizers are not ecologically harmless.

Preferably, the additive component comprises from 0.1 to 10 percent by weight, particularly preferably from 3 to 6 percent by weight, of at least one biodegradable stabilizer. The degradable stabilizer is preferably lignin sulfonate, linseed oil, or linseed oil varnish. By addition of the stabilizer, the flow properties of the material can be improved. Lignin sulfonate reacts with the proteins of the protein glue, whereas linseed oil and linseed oil varnish both cure by oxidation. Both reactions help give the material additional mechanical stability. In addition, both reactions protect the material against moisture, in such a manner that damage or softening of the material in the case of incidental liquid contact can be prevented.

The additive component preferably contains additionally from 0.1 to 10 percent by weight of at least one means for increasing the water resistance. Particularly preferably, as means for increasing the water resistance, tannin, corilagin, Ganidin, potash alum, urea, casein, ferulic acid, gossypol, sulfonic acid, an enzyme such as lysyl oxidase, transglutaminase, laccase or a mixture thereof is used in the material. By using such a means, the protein glues present in the material are additionally crosslinked, whereby the water resistance of the cured material is increased. The additional crosslinking results from a chemical denaturation of the proteins present in the protein glue, or by an enzymatically catalyzed crosslinking reaction.

Alternatively, other means for increasing the water resistance can also be used, such as, e.g., aluminum sulfate.

Preferably, the degradable material further comprises a hydrophobic component, in particular gum arabic, mastic, colophony, sandarac or a mixture thereof.

Further preferably, the hydrophobic component can also comprise Vaseline, turpentine oil, milk, casein or beeswax.

The water resistance of the cured material may be increased or set via the hydrophobic additive. As a result, a material may be produced which can be briefly exposed to water without being damaged, whereas the material nevertheless can be completely disintegrated by a relatively long exposure to water, in particular to hot water or steam. This permits, e.g., the use of the material for producing plates or dishes which are washable, or of a molded part having a surface which can be cleaned in the moist state.

Alternatively, the water resistance of a molded part produced from the material may also be increased by application of a suitable hydrophobic coating or by lacquering.

Preferably, the additive component contains at least one natural dye. The natural dye is particularly preferably an iron oxide pigment. By adding a natural dye, differently dyed molded parts may be produced with the material according to the invention, without the biological compatibility of the disintegrated material being impaired in the process. Iron oxide pigments permit the material to be colored yellow (iron oxide yellow; C.I. Pigment Yellow 42), red (iron oxide red; C.I. Pigment Red 101) and black (iron oxide black; C.I. Pigment Black 11). In addition, the use of iron oxide as dye causes a more rapid oxidation of the stabilizer, in particular of linseed oil or linseed oil varnish, wherein a molded part produced from the material according to the invention becomes mechanically stable still more rapidly.

In addition to iron oxide pigments, other natural dyes can also be added to the material such as, e.g., copper sulfate, copper acetate or cochineal red (C.I. Acid Red 18), depending on the color desired.

In addition, artificial colors may also be added to the material, which, depending on the environmental compatibility of the colors, could lead to the fact that the disintegrated material needs to be disposed of separately.

The additive component further preferably comprises at least one foaming agent, preferably sodium hydrogen carbonate. Via a foaming agent, the density of the material can be reduced via introduction of gas inclusions, in particular of carbon dioxide. Depending on the amount of foaming agent, the number of gas inclusions can be varied. A great number of gas inclusions increases the sound-protection or heat-insulation factor of the material.

Other preferred foaming agents are sodium carbonate decahydrate, sodium dodecylpoly(oxyethylene) sulfate, ammonium carbonate and also potassium carbonate.

Alternatively, the material can also be foamed by other methods, for example by introducing carbon dioxide, nitrogen, or another propellant gas under pressure, e.g. during an extrusion operation.

Preferably, the additive component comprises at least one biopolymer. The at least one biopolymer is preferably lignin, chitin, polycaprolactone, thermoplastic starch, cellulose acetate, polylactic acid, casein, polyhydroxybutyric acid, polyhydroxyalkanoate, cellulose hydrate, cellulose acetate, cellulose acetobutyrate, dextrose, dextrins, or a mixture thereof. By adding a biopolymer, the processing properties of the material such as flowability, curing rate, potlife or adhesive strength can be modified. In addition, the properties of a molded part produced from the material, such as elasticity, mechanical strength, weight and chemical resistance, can also be modified in a targeted manner.

It should be pointed out that some biopolymers can have at the same time a hydrophobic action, such as, for example, colophony, mastic or sandarac, and can also be used as hydrophobic component, or as a part thereof.

Preferably, the additive component comprises a mineral filler. This filler comprises in particular wollastonite, talc, magnesium oxide, or a mixture thereof.

Further preferred mineral fillers comprise mica, kaolinite, montmorillonite, calcium carbonate and also perlite or a mixture thereof.

The mineral filler prevents a shrinkage or warping of a molded part produced from the material. In addition, the mineral filler can increase the fire retardance of the material. Alternatively, other mineral fillers can also be used.

Silicates of lithium, sodium or potassium that are used, in particular, as amorphous water glasses, and also colloidal silicas and lignin sulfonate have the important advantage that they do not simply cause an advantageous effect in the material according to the invention, but also cause the modification of the rheological properties, the water resistance and the curing rate of the material.

A further aspect of the present invention relates to a method for producing a molded part made of degradable material. In the method according to the invention, first a degradable material according to the preceding description is introduced in liquid form. Subsequently, a molded part is produced from the degradable material by pressing, in particular by compression molding, extrusion, blow-molding, rotary molding, casting, injection molding, vacuum molding or by three-dimensional printing. Finally, the molded part is cured.

The degradable material according to the invention, on account of the components used, is liquid or at least flowable. As a result, the degradable material may be shaped into any desired molded parts which, after curing, owing to the natural fibers used, have a wood-like appearance. In addition, it has been found that the degradable material according to the invention can be used as substrate for three-dimensional printers. In three-dimensional printing by the melt-coating method (fused deposition modeling), the material according to the invention can be used in liquid form. When used in a printer which operates according to the multi-jet modeling (also polyjet modeling) method, the material is dried in advance and comminuted to a powder. The powder is then placed in the three-dimensional printer, wherein water is used as binder.

Preferably, the molded part produced, during or after curing, is irradiated with UV light. The UV light preferably has a wavelength of 200 nm to 280 nm, particularly preferably of 253 nm.

Via the irradiation with UV light, the proteins present in the protein glue can be denatured at the surface of the molded part and crosslinked with one another. The water resistance of the molded part can be additionally increased thereby.

"Curing" in the context of the present application is taken to mean the process in which the degradable material, after generation of the molded part, is solidified by chemical processes or by binding processes. The curing begins immediately after extrusion, pressing, molding or printing of the molded part and lasts until the molded part produced from the material is inherently dimensionally stable. In the case of the material according to the invention, the curing time typically takes up to two days, wherein, depending on composition of the material, curing times of less than one hour can also be achieved.

Preferably, the cured molded part is additionally dried until the water content of the cured material is below 1 percent by weight. Particularly preferably, the molded part is additionally dried until the water content is below 0.2 percent by weight.

It has been found that the additional drying step can additionally increase the water resistance of the cured material. Without wishing to be bound by any theory, this effect appears to be based on the fact that via a reduction in the water content to below 1 percent by weight, further intermolecular amide bonds form in the proteins present in the protein glue, whereby the degree of crosslinking of the proteins can be additionally increased.

An additional aspect of the present invention relates to a method for introducing a three-dimensional shape into a casting composition, preferably into concrete. In this case, before the casting composition is cast, a negative copy of the three-dimensional shape made of the degradable material is applied to an inner wall of a casting mold or shell. Particularly preferably, the negative copy is applied to the inner wall of the casting mold or shell by three-dimensional printing. After the casting and curing of the composition, the casting mold or shell is removed and the negative copy made of degradable material is disintegrated by charging with hot water or with hot steam. Particularly preferably, the negative mold is disintegrated by hot water or by steam.

As a result, without great expenditure, complex three-dimensional shapes may be introduced, e.g. into a concrete wall. In particular, the introduction of undercut grooves into a concrete wall is considerably simplified by the method according to the invention. In order to remove the entire negative copy made of degradable material, the negative copy can be exposed to the hot liquid under elevated pressure.

A further aspect of the present invention relates to a method for producing the degradable material according to the invention. In a first step, a binder component is produced by mixing the protein glue with the water. Thereafter, the natural fibers and also any additive component present are mixed with the binder component in an agitator. The agitator used is preferably a planetary agitator. Alternatively, a different agitator such as, e.g., a compounder, can also be used. Finally, the hygroscopic mineral is added.

The substances present in the additive component may be added to the material individually one after the other. Alternatively, however, first all substances of the additive component can be mixed, wherein this mixture is then added to the binder component and the natural fibers.

Preferably, for production of the binder, the protein glue and the water are heated before or during the mixing to a temperature of 60° C. to 80° C., preferably of 65° C. to 70° C. As a result of the heating, the protein glue becomes liquid and may be mixed with the water.

Preferably, before addition of the hygroscopic mineral, the mixture obtained is dried and processed to form powder. By addition of the hygroscopic mineral, an intermediate product is obtained. Added to the intermediate product not until immediately before use of the material is an amount of water which corresponds to 25 to 200 percent by weight of the amount used for producing of the binder component.

This method is particularly highly suitable for production of the degradable material according to the invention for use in a three-dimensional printer which operates by the multi-jet modeling method. In this case the powder is mixed with the water in the printer and applied to a suitable substrate. Via this method, a pulverulent intermediate product may be produced, even on a large scale, which can then be packaged and stored in portions in defined amounts. Not until directly before processing of the material to form a molded part is the pulverulent intermediate product mixed with a suitable amount of water. If the intermediate product is portioned, the amount of water must be adapted in accordance with the portion size. By variation of the amount of water to be added, in addition, the viscosity and consistency of the material can be varied.

From the detailed description hereinafter and the totality of the patent claims, further advantageous embodiments and combinations of features of the invention result.

BRIEF DESCRIPTION OF THE DRAWINGS

In the drawings used for illustration of the exemplary embodiment.

In principle, in the figures, the same parts are given the same reference signs.

WAYS FOR CARRYING OUT THE INVENTION

Figure 1:
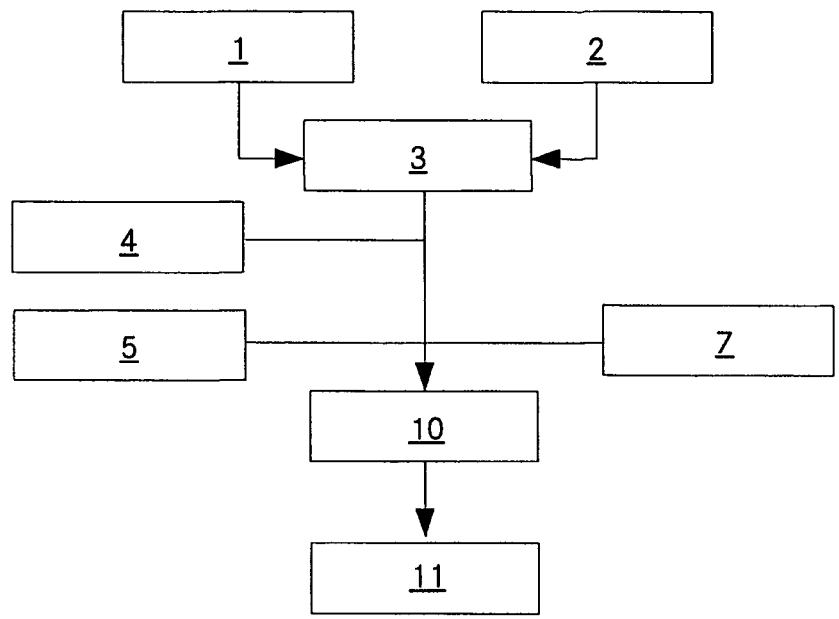
FIG. 1 shows a schematic image of a production method of the degradable material according to the invention.

FIG. 1 shows a schematic image of a production method for a material 10 according to the invention. First, the protein glue 1 is mixed with the water 2 with heating to 65° C. to 70° C. in a planetary agitator to form the binder component 3. With further stirring, first the natural fibers 4 are added to the binder component 3. Subsequently the additive component and the hygroscopic mineral 7 are added in the form of a powder. The substances used in the additive component 5 can be added to the material individually sequentially, or else first all can be mixed with one another and then the mixture resulting therefrom can be added to the material. The degradable material 10 thus obtained can then be processed in processing step 11 to form a molded part by pressing, extrusion, blow-molding, rotary molding, casting, injection molding or vacuum molding.

Figure 2:
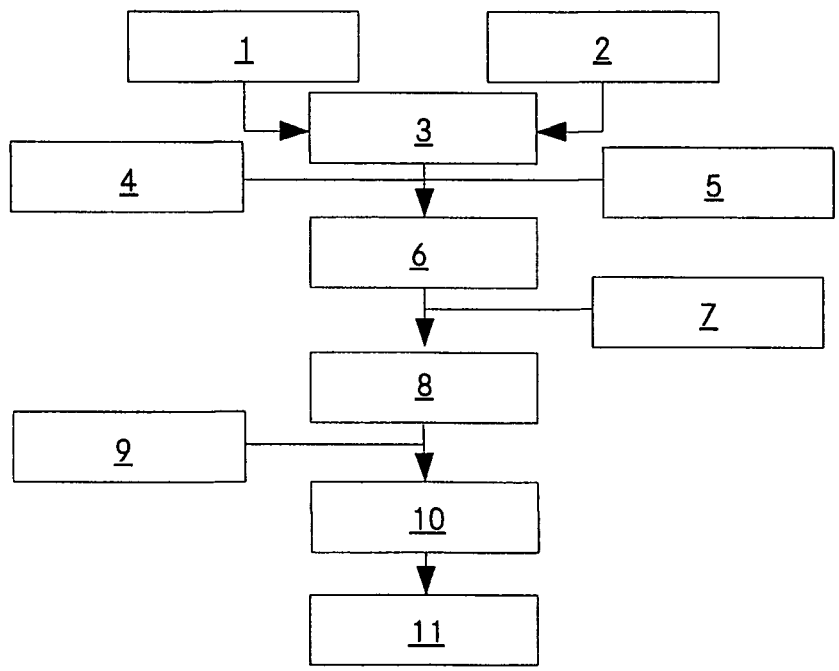
FIG. 2 shows a schematic image of an alternative production method.

FIG. 2 shows a further alternative production method for the degradable material 10 as a schematic overview. The protein glue 1 and also the water 2 are mixed together to form the binder component 3 in a planetary agitator with heating to 65° C. to 70° C. The natural fibers 4 and the additive component 5 are added. In a subsequent drying and pulverization step 6, the mixture is dried and processed to a particle size of approximately 0.05 mm. The pulverization preferably proceeds in a mill. The hygroscopic mineral is added to the powder. The resultant intermediate product 8 can be stored over a relatively long time. It is also possible that the intermediate product 8 is portioned and packaged for later use. Shortly before use, an amount of water 9 is added to the intermediate product 8, which amount of water corresponds to 25 to 200 percent by weight of the amount of water 2 used in the production of the binder component. The degradable material 10 thus obtained can, in a subsequent processing step 11, be processed to form a molded part, for example by a three-dimensional printer.

EXAMPLE 1

In a first example, 30 g of water were mixed cold with 38 g of rabbit-skin glue and then heated in the water bath to 65° C. To this binder component were added 17 g of softwood fibers having lengths from 0.3 mm to 1 mm, and also 7 g of glycerol. The mixture was charged into the rear hopper of an extender screw pump and 8 g of gypsum powder were added continuously to the transported mixture via the front hopper. The material was extruded to form a rod at a pressure of approximately 6 bar through a die having a diameter of 2 mm. The extruded material can be further processed subsequently, e.g. by pressing. Alternatively, by extrusion through a suitable die, elongate molded parts having various cross sections can also be produced, which can be cut to a desired length by a knife or by a saw before or after curing.

EXAMPLE 2

In a second example, 36 g of rabbit-skin glue were stirred into 28 g of boiling water in order to produce the binder component. To the binder component were added 7 g of glycerol. 15 g of softwood fibers having lengths from 0.7 mm to 3.5 mm, 0.6 g of an iron oxide powder as coloring agent and also 7.4 g of gypsum powder were added to the binder component and the material obtained was mixed well by a planetary agitator. Shortly before use of the material, 5 g of linseed oil varnish were added. The material was then poured into a mold and pressed cold for 20 minutes at a pressure of 2 kg/cm$^2$ to form a molded part.

EXAMPLE 3

In a third example, 26 g of water were mixed with 33 g of rabbit-skin glue, allowed to stand for 30 minutes, and then heated in a water bath to 70° C. in order to produce the binder component. Subsequently, 33 g of nutshell granules were added and the mixture was mixed vigorously in a planetary agitator. The composition obtained was dried and subsequently comminuted in a mill to form a powder having a mean particle size of approximately 0.05 mm. By adding 8 g of gypsum powder, a storable intermediate product was obtained. The intermediate product was then charged as substrate into a three-dimensional printer (ZPrinter© 150 from 3DSystems), which operates according to the multi-jet modeling method, wherein 26 g of water were used as binder.

EXAMPLE 4

A degradable material having an elevated water resistance was able to be obtained using the following fourth example:

For the binder component, 21 g of glutin glue were mixed cold with 21 g of water and then heated in the water bath to 65° C.-70° C. Thereafter, 2 g of alum were added to the binder. As additive, 10 g of natural wood fibers having a length distribution from 0.7 mm to 1.2 mm were added. In comparison with the materials produced in Examples 1 to 3, the material had an elevated water resistance.

EXAMPLE 5

In a fifth example, 21 g of glutin glue were mixed cold with 21 g of water and then heated in the water bath to 65° C.-70° C. Thereafter, 3 g of damar dispersed in ethanol to form a paste were added and the solution was mixed. As additive, 10 g of natural wood fibers having a length distribution from 0.7 mm to 1.2 mm were added. In comparison with the materials produced in Examples 1 to 3, the material had an increased water resistance.

EXAMPLE 6

In a sixth example, 21 g of glutin glue were mixed cold with 21 g of water and then heated in the water bath to 65° C.-70° C. As additive, 10 g of natural wood fibers having a length distribution from 0.7 mm to 1.2 mm were added. Subsequently, 8 g of silicon dioxide were added to the solution. In comparison with the materials produced in Examples 1 to 5, the material had a more rapid curing time.

EXAMPLE 7

In a seventh example, 21 g of glutin glue were mixed cold with 21 g of water and then heated in the water bath to 65° C.-70° C. As additive, 10 g of natural wood fibers having a length distribution from 0.7 mm to 1.2 mm were added. Thereupon, 5 g of perlite were added to the mixture as mineral filler. In comparison with the materials produced in Examples 1 to 6, the material had an improved shrinkage behavior.

The invention claimed is:
1. A degradable material made of biological components, comprising from 10 to 60 percent by weight of a protein glue made of at least one protein, from 2 to 50 percent by weight of natural fibers, from 2 to 15 percent by weight of at least one hygroscopic mineral, from 10 to 55 percent by weight of water and also from 0 to 50 percent by weight of an additive component, wherein the at least one hygroscopic mineral is calcium sulfate, calcium oxide, magnesium sulfate, zeolite or a mixture thereof.

2. The degradable material as claimed in claim 1, wherein the protein glue contains glutin, collagen, alginates, albumin, gelatin, chondrin, agar-agar, xanthan, or a mixture thereof.

3. The degradable material as claimed in claim 1, wherein the natural fibers comprise wood fibers, cereal fibers, nutshell fibers, grass fibers, cornmeal, cellulose fibers, cellulose flakes or a mixture thereof.

4. The degradable material as claimed in claim 3, wherein the natural fibers are softwood fibers.

5. The degradable material as claimed in claim 1, wherein the additive component comprises from 1 to 10 percent by weight of at least one biodegradable plasticizer.

6. The degradable material as claimed in claim 5, wherein the biodegradable plasticizer comprises glycerol, urea, triethyl citrate, sorbitol, xanthan, or an alkyl citrate.

7. The degradable material as claimed in claim 1, wherein the additive component contains from 0.1 to 10 percent by weight, of at least one biodegradable stabilizer.

8. The degradable material as claimed in claim 7, wherein the biodegradable stabilizer comprises lignin sulfonate, linseed oil, or linseed oil varnish.

9. The degradable material as claimed in claim 1, wherein the additive component contains from 0.1 to 10 percent by weight of at least one component for increasing the water resistance.

10. The degradable material as claimed in claim 9, wherein the component for increasing the water resistance comprises tannin, corilagin, potash alum, Ganidin, urea, casein, ferulic acid, gossypol, an enzyme, lysyl oxidase, transglutaminase, laccase or a mixture thereof.

11. The degradable material as claimed in claim 1, wherein the additive component comprises from 0.1 to 10 percent by weight of at least one hydrophobic component.

12. The degradable material as claimed in claim 11, wherein the hydrophobic component comprises gum arabic, mastic, colophony, sandarac or a mixture thereof.

13. The degradable material as claimed in claim 1, wherein the additive component comprises at least one biopolymer.

14. The degradable material as claimed in claim 13, wherein the biopolymer comprises lignin, chitin, polycaprolactone, thermoplastic starch, cellulose acetate, polylactic acid, casein, polyhydroxybutyric acid, polyhydroxyalkanoate, cellulose hydrate, cellulose acetate, cellulose acetobutyrate, dextrose, dextrin, or a mixture thereof.

15. The degradable material as claimed in claim 1, wherein the additive component comprises a mineral filler.

16. The degradable material as claimed in claim 15, wherein the mineral filler comprises wollastonite, talc, magnesium oxide, or a mixture thereof.

17. The degradable material as claimed in claim 1, wherein the hygroscopic mineral is in the form of a powder.

18. A method for producing at least one molded part, which comprises the steps:
   a) introducing a degradable material as claimed in claim 1 in liquid form;
   b) producing at least one molded part by pressing, extrusion, blow-molding, rotary molding, casting, injection molding, vacuum molding or by three-dimensional printing of the degradable material;
   c) curing the molded part.

19. The method as claimed in claim 18, wherein the material, during or after the curing of the molded part, is additionally irradiated with UV light having a wavelength of 200 nm to 280 nm.

20. The method as claimed in claim 18, characterized in that the material, after the curing, is additionally dried until the cured material has a water content of less than 1 percent by weight.

21. A method for introducing a three-dimensional shape into a casting composition including concrete, comprising the steps:
   a) applying a negative copy of the three-dimensional shape made of a degradable material as claimed in claim 1 to an inner wall of a casting mold or shell;
   b) casting the casting composition into the casting mold or shell and curing the casting composition;
   c) removing the casting mold or the shell; and
   d) disintegrating the negative copy made of the degradable material by charging with hot water or with steam.

22. A method for producing a degradable material as claimed in claim 1, which comprises the steps:
   a) producing a binder component by mixing the protein glue with the water;
   b) mixing the natural fibers and the additive component with the binder component in an agitator; and
   c) adding the hygroscopic mineral.

23. The method as claimed in claim 22, wherein, before addition of the hygroscopic mineral, the mixture obtained is dried and processed to form powder, wherein by adding the hygroscopic mineral, an intermediate product is obtained, to which an amount of water which corresponds to 25 to 200 percent by weight of the amount of water used for producing the binder component is added, not until immediately before use.

24. A degradable material made of biological components, comprising 10 to 60 percent by weight of a protein glue made of at least one protein, from 2 to 50 percent by weight of natural fibers, from 2 to 15 percent by weight of at least one hygroscopic material selected from calcium sulfate, calcium oxide, magnesium sulfate, zeolite or a mixture thereof, from 10 to 45 percent by weight of water and from 0 to 50 percent by weight of an additive component.

* * * * *